Jan. 5, 1926.  E. NELSON  1,568,411
PROCESS OF MAKING ARTICLES OF VULCANIZABLE MATERIAL
Filed Oct. 15, 1923  2 Sheets-Sheet 2
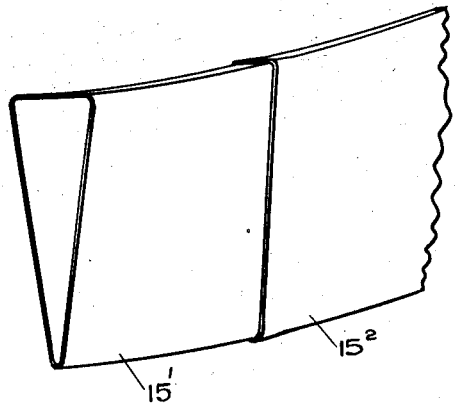
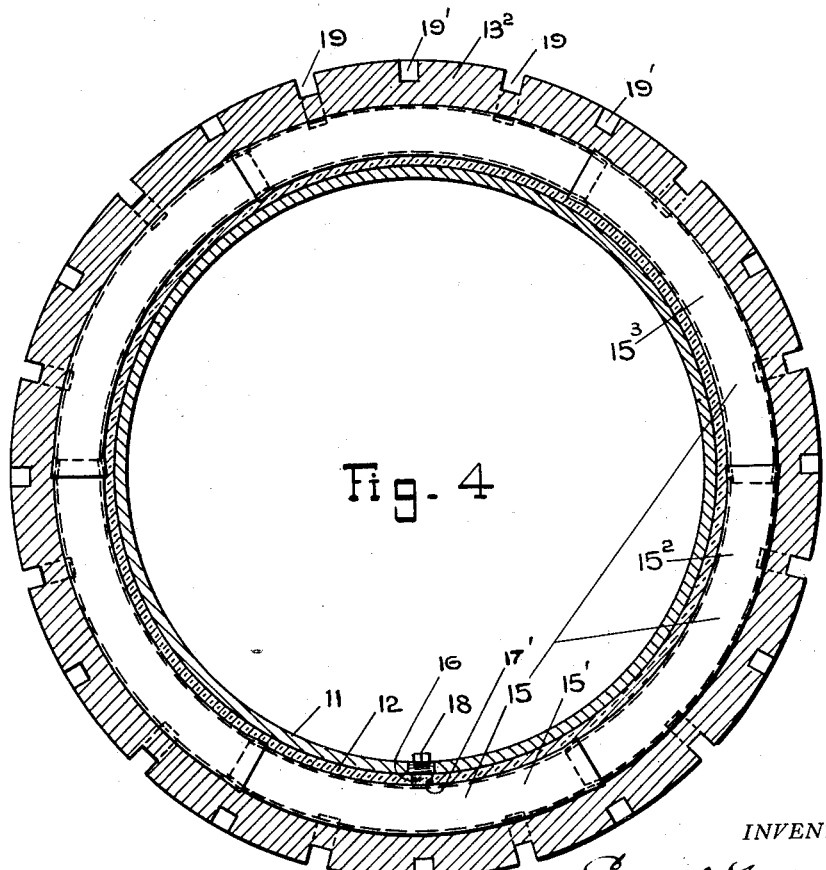

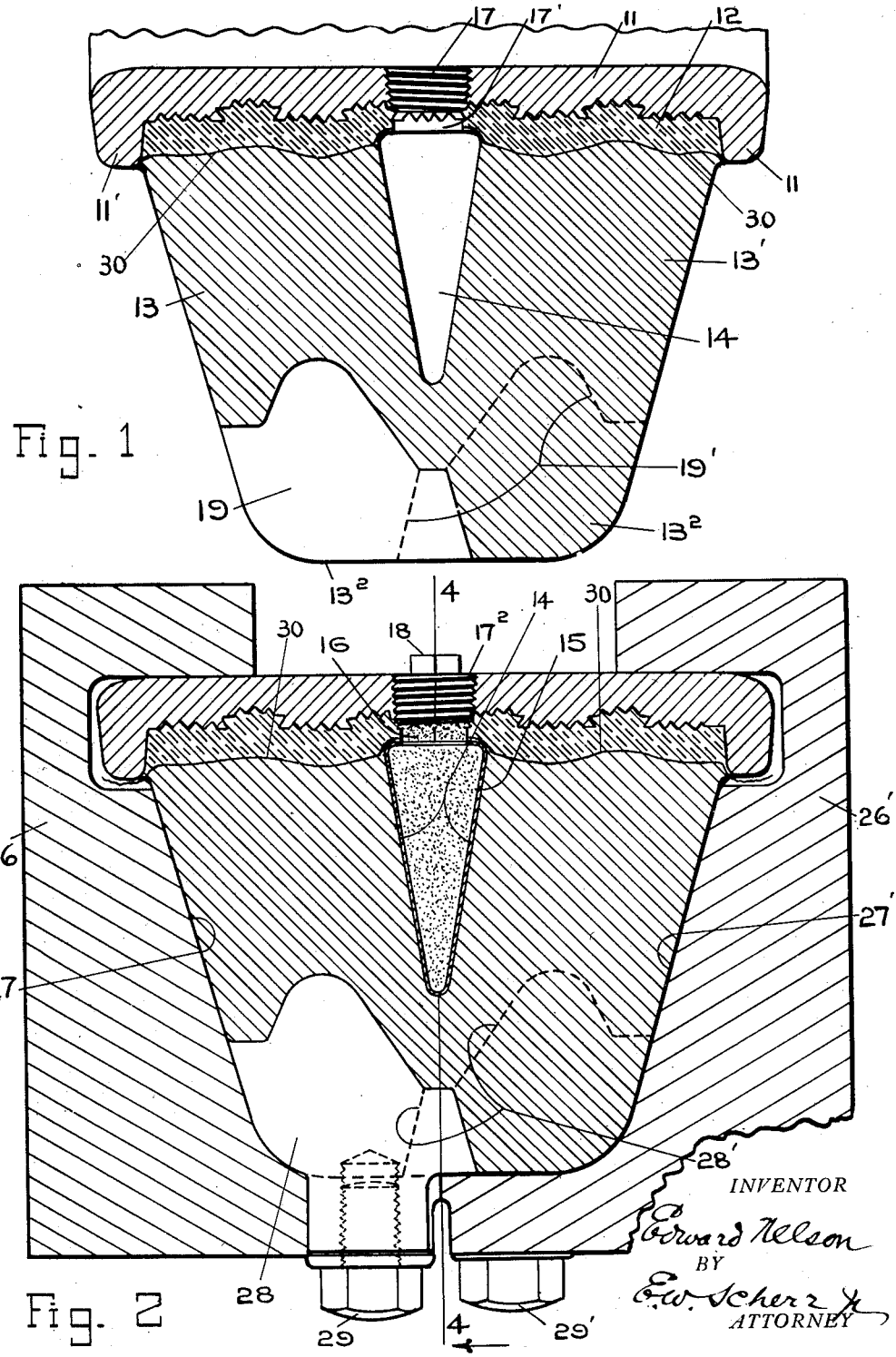

Patented Jan. 5, 1926.

1,568,411

UNITED STATES PATENT OFFICE.

EDWARD NELSON, OF BELLEVILLE, NEW JERSEY, ASSIGNOR TO O. & W. COMPANY, A CORPORATION OF NEW YORK.

PROCESS OF MAKING ARTICLES OF VULCANIZABLE MATERIAL.

Application filed October 15, 1923. Serial No. 668,611.

*To all whom it may concern:*

Be it known that I, EDWARD NELSON, a citizen of the United States, residing at Belleville, New Jersey, have invented certain new and useful Improvements in Processes of Making Articles of Vulcanizable Material, of which the following is a specification.

My present invention is an improved process and means for making articles composed wholly or partly of vulcanized material and having closed, or substantially closed, cavities therein, such for example as vehicle tires of rubber compound of the general type illustrated in Fig. 1 of the annexed drawings.

My invention is particularly applicable to the manufacture of hollow cushion tires having a resilient body of rubber compound mounted on and vulcanized to a unitary metallic base band, with the internal cavity in the said tire body entirely closed except for one or more small openings thereinto through the said base band for extracting the cavity forming core therefrom.

In the manufacture of such metal base tires, having circumferentially extending internal cavities, the cost of manufacture, and the extent to which serious weakening of the metal base by the core extracting openings therein may be avoided, are dependent to a large extent on the process and means employed for producing and maintaining the cavities in the tire during the molding and vulcanization thereof, and for removing the restraining effect of the core from the said article after it has been otherwise completed. Various means for accomplishing this have been proposed, some of which are in common use with varying degrees of effectiveness. Among these may be mentioned: the making of the core of a multiple number of permanent sections of rigidly formed material and the removal of the said sections from the completed tire through circumferentially continuous or interrupted slits or slots in the metal base; the making of the core of fusible or soluble material molded into a substantially rigid, solid or hollow, unitary or sectionally joined form before it is placed within the article in which it is to form or maintain the cavity, and the removing of it in a fused or dissolved condition through apertures in the metal base after the article has been otherwise completed; and the making of the core as an inherently rigid, hollow arched, self sufficient supporting annulus of brittle material or of material that becomes brittle under the heat of vulcanization, the supporting or restraining effect of the core being destroyed without removal thereof by external pressure or impact applied to the tire body to pulverize the said hollow core. Also fluids both gaseous and liquid have been confined, under pressure or otherwise, in a previously formed cavity in the rubber body of the tire, or confined in a containing jacket around which the body of the tire has been built up, to keep the said cavity properly distended during the molding and vulcanization processes, the said fluids being removed in whole or in part thereafter through one or more apertures therefor. Some of these means for forming and maintaining the cavities during the molding and vulcanization of the articles, and for evacuating or releasing the restraint of the cavities thereafter, have advantageous features in some respects for certain constructions of tires or other articles, and important defects in other respects for the same or other constructions; the slotting or slitting of the metal base for the removal of the cores made of permanent sections not only weakening them but rendering it more difficult to keep the tires properly secured to the vehicle wheels; the fusible materials being expensive and, like the fluid materials, being generally insufficiently rigid for some shapes of the cores and to highly localized pressures thereon during a part or all of the periods of molding and vulcanization to properly maintain the shape and size of the cavity; while the soluble materials, if sufficiently rigid, are exceedingly brittle and are difficult and expensive to remove from the cavity of the finished article; and the hollow cores which are fragile, or become fragile under the heat of vulcanization, are insufficiently strong and rigid to be self sufficient for the purpose unless inordinately thick and are then difficult to break up or otherwise relieve of their restraining effect on the cavity, and such portions as are left in the cavity even in a non-restraining condition are so sharp and hard as to be a menace to the tire in starting cuts in the rubber.

The principal object of my present invention, therefore, is to provide a core, and a suitable process of use therefor, that will be cheap and sufficiently rigid generally and locally to properly maintain the desired shape and size of the cavity in the article during the various steps involved in the formation, molding and vulcanization thereof, and at the same time be readily and cheaply rendered nonrestraining on the cavity preferably by being completely removable through one or more small apertures in the article provided therefor. Since no single material with which I am acquainted has all the properties necessary to enable it to maintain proper rigidity or form for the cavity during the molding and vulcanization processes and at the same time be sufficiently cheaply, readily and completely rendered nonrestraining on, or removable from, the said cavities through small apertures after the articles are otherwise completed, I form the core for the cavity out of two or more materials, each of which alone would not effect the desired result but which by a combination of their properties and actions are most effective for the purpose.

With these and other objects in view, as more fully set forth hereinafter, my invention consists of the novel process and means herein described and claimed for the manufacture of articles of the class described, it being understood that while I have for convenience illustrated the preferred form of my invention and its use in connection with the manufacture of vehicle tires, I do not limit myself to such preferred form or to vehicle tires.

Referring now to the drawings: Fig. 1 is a cross section and partial elevation of a portion of a finished hollow cushion tire having a metallic base band and made in accordance with the present invention; Fig. 2 is a similar cross section before the removal of the core or the mold, with the aperture closing plug shown in elevation; Fig. 3 is a perspective view partly in section of a portion of the core of Fig. 2; and Fig. 4 is a circumferential section on a reduced scale through the tire body and base, after the removal of the mold, and is taken on the line 4—4 of Fig. 2, looking in the direction of the arrow, with the core and aperture closing plug shown in side elevation, as more fully described hereinafter.

The cushion tire shown in Fig. 1 comprises a unitary, annular, metal base band 11, of the well known standard type, on the outer tongued and grooved circumference of which is secured by vulcanization a layer of hard rubber 12 to which there is in turn secured by vulcanization the rubber body of the tire embodying the two similar laterally inclined annular side walls 13—13' and integrally united nose portion 13$^2$ which with the base 11 enclose the cavity 14. In Fig. 2 the cavity 14 is shown as containing the cross-sectionally wedge shaped core which comprises the jacketing member 15 and the filling and supporting material 16, there being one or more apertures 17 provided in the metal base band 11 through which the said core may be removed after the tire is otherwise completed.

Referring to Figs. 1, 2 and 4, the rubber body of the tire has formed in it a series of laterally alternating, circumferentially spaced, exteriorly open recesses 19—19' which extend laterally across the nose of the tire, from their respective edges to slightly beyond the centre, and radially deeply into the nose portion 13$^2$ and into the side walls 13—13'. In the manufacture of tires having both an interior circumferentially extending cavity and a series of radially deep, circumferentially spaced, outer openings, it is desirable and generally necessary to form these exterior openings in the body of the tire in the molding thereof with the core for the interior cavity in place, regardless of whether the main body of the tire with the circumferentially extending cavity formed therein has been produced by an extruding process or by building the rubber body up in layers around the core. A well known form of mold for forming such exterior openings in the body of a hollow tire is illustrated in a general way in cross section in Fig. 2, and is more fully shown and described in Overman U. S. Patent #1,223,726. Such a mold, as regards this feature, may be briefly described as comprising the two similar circular discs or side rings 26—26', in the proximate faces of which annular recesses 27—27', respectively, are formed, each having the shape of half of the exterior surface of the tire and each provided with a series of circumferentially spaced detachable fingers or inserts 28—28' respectively, which are secured to their respective side rings by bolts 29—29' respectively, in staggered relation to each other. These fingers or inserts 28—28' mash into the body of the tire as the two halves of the mold are closed together and thus form the exteriorly open cavities 19—19' in the tire. It will be readily seen that the forming of such deep cavities 19—19' in the body of the tire produces during the molding process exceedingly high pressures in the plastic body of the rubber at the points where these cavities are located, and that consequently the core for maintaining the size and shape of the cavity 14 in the tire is subjected to exceedingly high localized deforming pressures, therefrom. Also in tires which have only shallow exteriorly open cavities, or even in those which have no such exteriorly open cavities, the interior core is subjected to highly localized deforming pressures when the mold is forcibly closed and compresses the rubber body of the tire, since the shape of the mass of rubber compound prior to such molding varies at different points more or less from the exact shape of the mold, and the internal stresses in the rubber compound are correspondingly variable until the slow yielding of the plastic mass equalizes them. In any case, therefore, it is important that the core for the interior cavity, around which the rubber body of the tire is compressed and vulcanized in the mold, be either sufficiently strong and rigid as to withstand without fracture such localized pressure on it, or that it be sufficiently rigid to maintain the proper shape and size of cavity, and at the same time be sufficiently flexible to elastically yield to excessive local stresses. Any fractures or open joints in the core, especially cross-sectionally, result in the rubber compound being squeezed therein to form thin dams or diaphragms that seriously interfere with or prevent the removal of the core from the otherwise finished tire.

Referring to Figs. 3 and 4, it will be noted that I have for convenience illustrated the jacket 15 of the core as formed of multiple, arcuately extending sections 15′, 15² etc. united together to form a complete hollow annulus. Where the circumference of the base of the interior cavity 14 is less than the outer circumference of the flanges 11′ of the base band 11, if it have flanges as here shown, it is necessary that the jacket 15 have at least one joint in it that can be cemented or otherwise closed after the jacket 15 is mounted on the base. If desired the base of the jacket 15 may rest snugly against the outer circumference of the base band 11, or it may be seated on or in the layer of hard rubber compound 12. If preferred the jacket may be made into and applied as a completely closed hollow ring with the circumference of its base larger than the outer circumference of the flanges 11′, and the hard rubber 12 filled in or raised up to support the base of the jacket in this position.

One of the materials which I prefer to use for making this jacket 15 is the pyroxylin plastic commonly known as celluloid, partly on account of its strength and elasticity at the normal temperature at which the rubber compound is molded, and the facility and cheapness with which it may be manufactured into the desired form, but also on account of its organic properties by which the heat of vulcanization partially vaporizes and converts it into a granular condition in which it is readily removable from the cavity through the orifice 17 provided therefor, as hereinafter more fully described. After the jacket sections 15′ etc. have been joined into a hollow annulus 15 mounted on the base band 11, or on the previously applied hard rubber compound 12 around the base band 11, apertures 17′ and 17² are formed through the hard rubber 12 and in the base of the said jacket 15 respectively in line with one or more of the apertures 17 in the steel base band 11. Fine dry sand or other similar and preferably inorganic material is then poured or injected through the apertures 17, 17′ and 17² into the hollow of the jacket 15 until it is completely filled, with the sides of the said jacket forced to the form or contour which it is desired that the core shall have to form the said cavity 14 in the tire, the sand or other filling material being confined in the cavity by the plugs 18 in the threaded holes 17.

The object of using sand or similar inorganic material in a substantially granular condition is that, besides being substantially unaffected by the pressure and heat of molding and vulcanization of the tire body, it has practically the properties of a fluid in the readiness with which it may be poured and packed into the containing jacket and afterward be readily poured or shaken out of the cavity, while at the same time when packed into the containing jacket the core thus formed has practically the properties of a rigid solid body in resisting local deformation since such a granular material does not yield freely to local pressures as a fluid does.

After the core jacket 14 has been mounted on the base and it and the apertures 17′ filled with the supporting material 16 to the proper extent and the one or more apertures 17 in the base closed by the plugs 18 so as to properly confine the said material 16, the uncured rubber compound, which has previously been tubed or otherwise formed, or prepared in laminated strips for winding on in successive layers, is applied on top of the previously applied harder rubber compound 12 and around the core to form the body of the tire. The whole tire is then placed in the recesses 27—27′ of the mold in which it is subjected to the usual process of molding and vulcanizing under the proper degree of heat and pressure until the rubber compounds forming the body and the base connection to the metal band are properly cured. The tire is then removed from the mold and the plugs 18 closing the aperture or apertures 17 in the steel base 11 are removed. The fine dry sand which has remained in an incoherent, granular or comminuted condition all during the process of curing the tire is then readily removed by pouring, shaking, blowing or sucking it out of the cavity through the aperture 17. The core jacket 15 also comes out of the cavity with the sand or other filling material, owing to the fact that the heat of vulcanization to which the rubber compound has been subjected partially vaporizes and converts the celluloid into a granular and substantially non-cohesive condition, so that it readily comes out of the cavity along with the sand. Should for any reason the jacket tend to remain in the tire cavity in a granular but slightly cohesive condition when the filling material is removed, it may be very readily removed by blowing a blast of air, steam or other gas through it or washing it out with water or other liquid.

Where the jacket of the core is made of an organic material that begins to partially vaporize at as low a temperature as celluloid does, it is best not to have the base of the jacket in direct contact with the metal base ring, but on the contrary to have as much thickness of the rubber compound between the jacket and the metal as is consistent with the proper location of the base of the cavity to permit the unrestrained expansion of the side walls into the cavity when the tire is in service. This is due to the fact that the more thoroughly the jacket is insulated by the rubber compound against heat reaching it, the more thoroughly set the rubber body of the tire will be before the jacket begins to disintegrate under the heat reaching it that has first passed through said rubber body. The gases which are generated by the partial disintegration of the jacket have no disturbing effect on the rubber body of the tire, or on the filling material of the core, as these gases are allowed to pass through the rubber compound and out of the mold by suitable vents, preferably consisting of fibrous threads laid on the jacket and passing to the outside through the rubber compound and which thus thoroughly vent the said mass of rubber compound. These threads are conveniently laid laterally across and on the joint between the harder rubber compound and the softer compound of the side walls, and may be readily held in position thereon before the softer rubber is applied by having the threads pass under the base of the core jacket 15 as indicated by the lines 30 in Figs. 1 and 2.

It is to be understood that I do not confine my invention to the use of celluloid for the jacket of the core or to sand for the filling material therefor, though these are the materials I prefer. As far as I am aware, the use, in the process of molding and vulcanizing of hollow articles of vulcanizable material, of a core therefor comprising a flexible jacket of coherent material normally collapsible under the molding and vulcanizing pressure and held against such collapse to a substantially definite form by a filling material of incoherent solid particles, which are in turn confined to a substantially definite form by the said jacket, is novel and I shall therefore claim it broadly as well as the more specific features devised in connection with it.

Also while I prefer to completely remove the jacket of the core from the cavity of the finished article and to make this readily feasible through small apertures by having the jacket material partially vaporized and disintegrated by the heat of vulcanization, still I do not confine my invention to involving such removal of the jacket, but only to the removal of such portion of the core as offers substantial restraint to the deformation of the cavity in the finished article, since in such articles as tires the main function of such an internal cavity is to provide space into which the walls of the tire body may unrestrainedly expand as they are radially compressed under the road reactions in service. Where the jacket is relatively thin and as unabrasive as celluloid it might readily be left in the cavity without causing undue restraint of the side walls of the tire and with little risk of damage thereto through cutting or abrading the rubber.

Claims:

1. In a process for making cored articles of vulcanizable material vulcanized under heat, the use of a core comprising a body of substantially incoherent particles infusible at the temperature of vulcanization confined to a substantially definite form by a jacket of initially coherent material that becomes substantially incoherent during the vulcanization of the said article.

2. In a process for making cored articles of vulcanizable material vulcanized under heat, the use of a core comprising a material which the heat of vulcanization partially vaporizes and converts into a granular condition.

3. In a process for making cored articles of vulcanizable material molded and vulcanized under pressure and heat, the use of a core comprising a thin jacket preformed to the shape and size of the core but normally collapsible under the pressure of molding and a filling material of incoherent particles internally reinforcing the jacket against collapse and holding it to its preformed shape during the initial stages of vulcanization, said jacket being rendered substantially incoherent by the heat of vulcanization.

4. In a process for making cored articles of vulcanizable material molded and vulcanized under pressure and heat, the use of a core comprising a thin jacket of material partially disintegrable under the heat of vulcanization preformed to the shape and size of the core but normally collapsible under the pressure of molding and a filling material of incoherent particles internally reinforcing the jacket against collapse and holding it to its preformed shape until it is partially disintegrated.

5. In a process for making cored articles of vulcanizable material vulcanized under heat, the use of a core comprising a jacket of material partially disintegrable by vaporization under the heat of vulcanization reinforced by a filling material of loose particles, with vents through the vulcanizable material for conducting the vapors from the jacket to the exterior of the article.

6. In a process for making cored articles of vulcanizable material molded and vulcanized under pressure, the use of a core comprising a preformed jacket of material rendered substantially incoherent by the heat of vulcanization normally collapsible under the molding pressure and a material substantially incompressible under the molding pressure filling the jacket and holding it against such collapse, the said filling material at the end of the vulcanization process being in a loose granular condition readily removable from the article through a small aperture therein formed therefor.

7. In a process for making cored tires of rubber compound vulcanized under heat to unitary metallic base bands having an aperture therein for removing the core, the use for the core of a body of substantially incoherent solid particles confined to a substantially definite form by a jacket of initially coherent material that becomes under the heat of vulcanization less coherent and more readily removable from the tire with the said incoherent particles through the said aperture in the base band.

8. In a process for making cored tires of rubber compound vulcanized to unitary metallic base bands having an aperture therein for removing the core, the use during vulcanization of a substantially rigid core that at and by the completion of the vulcanization comprises substantially incoherent particles readily removable from the tire through the said aperture.

9. In a process for making tires of rubber compound having an annular cored cavity and molded on and vulcanized to a unitary metallic base band, the provision in the base band of an aperture through which the core may be removed from the cavity and the use for the core of a combination of materials that act as a substantially rigid body during the molding operation and that becomes a mass of substantially incoherent particles during the vulcanization and readily removable thereafter from the cavity through the said aperture.

10. In a process for making tires of rubber compound vulcanized under pressure and heat on cavity forming cores, the use of a core comprising a pyroxylin jacket filled with a pressure resisting material of incoherent solid particles which with the jacket after vulcanization are readily removable from the tire through an aperture formed therein therefor.

11. In a process for making cored tires of rubber compound molded and vulcanized under pressure and heat, the use of a core comprising a body of incoherent solid particles substantially infusible at the temperature of vulcanization initially held under the pressure of molding in a substantially definite form by organic material whose holding power is destroyed by the heat of vulcanization whereby the said core may be readily removed from the tire through an aperture formed therein therefor.

In testimony whereof, I have signed my name to this specification, this 12th day of October, 1923.

EDWARD NELSON.